United States Patent [19]
Fukao et al.

[11] Patent Number: 5,277,964
[45] Date of Patent: Jan. 11, 1994

[54] DISCHARGE RECORDING MEDIUM

[75] Inventors: Ryuzo Fukao, Suita; Taiji Matsumoto, Nayagawa, both of Japan

[73] Assignee: Hitachi Maxell, Ltd., Ibaraki, Japan

[21] Appl. No.: 853,260

[22] Filed: Mar. 18, 1992

[30] Foreign Application Priority Data

Mar. 19, 1991 [JP] Japan .................................. 3-081704
Jun. 6, 1991 [JP] Japan .................................. 3-163688

[51] Int. Cl.⁵ .................................................. B32B 9/00
[52] U.S. Cl. ........................................ 428/209; 428/195; 428/216; 428/457; 428/913; 156/233; 156/234
[58] Field of Search ............... 428/209, 913, 195, 216, 428/457, 914; 156/233, 234

[56] References Cited

U.S. PATENT DOCUMENTS 4,892,602  1/1990  Oike et al. ........................ 428/209
5,075,145 12/1991  Yamamoto et al. ................ 428/209

FOREIGN PATENT DOCUMENTS 58-98287  11/1983  Japan .
60-56589   4/1985  Japan .
61-14439  11/1986  Japan .

OTHER PUBLICATIONS

French Search Report.

*Primary Examiner*—Patrick J. Ryan
*Assistant Examiner*—Abraham Bahta
*Attorney, Agent, or Firm*—Birch, Stewart, Kolasch & Birch

[57] ABSTRACT

A discharge recording medium comprising a substrate and a thin metal layer which is formed on the substrate layer and is made of aluminum containing at least one metal selected from the group consisting of manganese, copper and magnesium, which has good environmental resistance and printing characteristics.

16 Claims, 1 Drawing Sheet

DISCHARGE RECORDING MEDIUM

BACKGROUND OF THE INVENTION

1. Field of the Invention

The present invention relates to a discharge recording medium with good environmental resistance and capable of good printing performance, on which information is printed by breaking apart a metal thin layer formed on a substrate layer by electric discharge and heat to perforate the thin metal layer.

2. Description of the Related Art

Heretofore, as one printing method which prints information having good environmental resistance, a thermal printing method has been used in which, a part of a thin layer of a low melting point metal is heated until molten to perforate the metal layer and print information.

Since a recording medium printed by the thermal printing method is not rewritable and has good long-time stability, this method is widely used to record money amounts, numbers or dates.

An example of the thermal printing method is disclosed in Japanese Patent Publication No. 19928/1984. In this patent, a magnetic recording layer is formed on a substrate and then a thin layer of a non-magnetic metal or alloy is formed, as a thermal recording layer, on the magnetic recording layer. Various modifications are also disclosed. For example, a colored layer may be provided between the thermal recording layer and the magnetic recording layer, or a colored layer and a protective layer may be provided on the thermal recording layer, or an adhesive layer may be provided between each pair of adjacent layers.

Since the thermal printing method records information by heating and cooling a thermal head, its printing speed is limited so that the use of this method is very much limited where high speed processing is required, for example in transportation, stations and supermarkets.

Another printing method which uses melting of a thin metal layer is a discharge printing method which is disclosed, for example, in Japanese Patent Publication No. 30157/1983 and U.S. Pat. No. 4,400,706. The information printed by this method is not rewritable either as in the case of the thermal printing method, and it has the advantage that high speed printing is possible.

A recording medium used in the discharge recording method, namely a discharge recording medium, has poorer environmental resistance than a recording medium used in the thermal printing method. In addition, by the discharge recording method, it is difficult to print clear images unless a high electric field is applied between a recording stylus and the thin metal layer. This is because the principle of the discharge recording method is based on the perforation of the metal layer by melting and splashing the metal from the part of the metal layer to be perforated, so that thickness of a protective layer cannot be made thin.

In addition, the discharge recording method is unsatisfactory in its recording density and may provide unclearer images than the thermal recording method. This is partly because the discharge breakdown of the thin metal layer is caused only in a part of a printing dot through which an electric current passes so that it is difficult to form a complete printing dot and partly because a condition of electric current from the recording stylus tends to be affected by a delicate change of the thickness of the protective layer on the metal layer.

As is clear from the printing mechanism, a clear image is produced only by the application of high energy such that a high electric field is generated between the recording stylus and the metal layer. To this end, there should be a certain resistance between the recording stylus and the metal layer. However, too high of a resistance will prevent passage of the electric current. The resistance cannot be completely controlled by the change of the thickness of the protective layer. That is, since the thickness of the protective layer is at most 1 $\mu$m, the thickness of the protective layer formed by a conventional coating means such as a gravure coater, will fluctuate within ±20%. At a part having a larger thickness, the electric resistance increases and passage of the electric current is difficult so that the printing density decreases, thus resulting in dispersion of the printing density.

It may be possible to decrease the dispersion of the printing density by a decrease of the thickness of the protective layer, but this will decrease the environmental resistance of the recording medium. As explained above, the discharge recording medium has a poor environmental resistance and low printing density.

When the discharge recording medium has a poor environmental resistance and is exposed to a harsh atmosphere, for example, a high humidity atmosphere, the thin metal layer will corrode so that its appearance is changed or a part of the metal layer drops off, whereby the printed parts disappear or fade. When the printing density of the discharge recording medium is low, visibility of the printed information is worsened, the printing quality deteriorate and reliability of the recording is lowered.

SUMMARY OF THE INVENTION

One object of the present invention is to provide a discharge recording medium which has good environmental resistance.

Another object of the present invention is to provide a discharge recording medium which achieves a high printing density.

According to the present invention, there is provided a discharge recording medium comprising a substrate layer and a thin metal layer which is formed on the substrate layer and which comprises aluminum containing at least one metal selected from the group consisting of manganese, copper and magnesium.

The discharge recording medium of the present invention may include a second metal layer which comprises a base metal having a lower standard electrode potential than the thin metal layer.

DETAILED DESCRIPTION OF THE INVENTION

Figure 1:
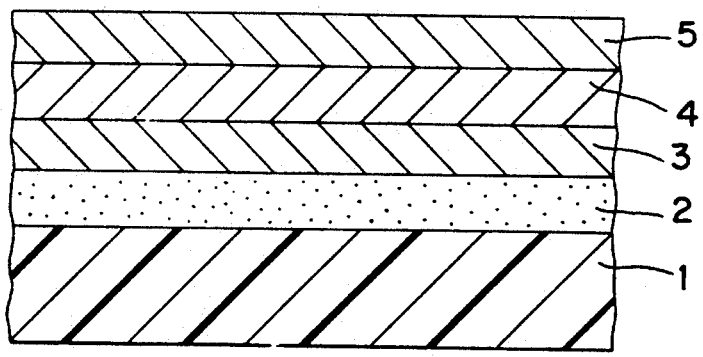
FIGS. 1-3 illustrate discharge recording media of the present invention.

To improve the environmental resistance of the discharge recording medium, the present invention forms the thin metal layer from aluminum containing at least one metal selected from the group consisting of manganese, copper and magnesium. As a result, not only are clear and sharp images printed but also the environmental resistance of the printed layer is improved.

The conventional discharge recording medium uses aluminum as a metal for forming the thin metal layer, because aluminum has good electric conductivity, good whiteness and good appearance when formed in the form of a thin film and is easily formed in a thin film with good productivity. The reason, however, why the conventional discharge recording medium has a poorer environmental resistance than the thermal printing medium is that, since the thickness of a protective layer is limited to about 1 μm or less, a poor barrier is provided against moisture and the thin metal layer corrodes when it is exposed to a corrosive atmosphere, such as a high humidity atmosphere.

The reason why the printing quality of the discharge recording medium is worse than that of the thermal printing medium is that, since the thickness of the protective layer is small, resistance between the recording electrode stylus and the thin metal layer is less than an optimum value so that it is difficult to induce the discharge by the high electric field.

It may be possible to improve the corrosion resistance by increasing the increase of the thickness of the protective layer. However with the increase of the thickness of the protective layer, the electric resistance excessively increases so that application of the electric current to the thin metal layer is difficult and thus the printing quality is deteriorated. For example, when the protective layer is made of an acrylic resin or a polyurethane resin a thickness of 2 μm or larger causes next to zero current passage.

According to the present invention, at least one metal selected from the group consisting of manganese, copper and magnesium is added to the thin aluminum layer. When such metal alloy is used, the metal layer has sufficient corrosive resistance, even when thickness of the protective layer is small.

An amount of manganese, copper or magnesium to be added to the aluminum is from 0.05 to 20% by weight, preferably from 0.5 to 5% by weight based on the weight of the aluminum. If this amount is less than 0.05% by weight, the corrosion resistance of the metal layer is not improved. When this amount exceeds 20% by weight, a stable solid solution of the aluminum and the addition metal is not formed, and in some cases, inclusions are deposited at grain boundaries of the crystal so that the corrosion resistance is deteriorated.

The thin metal layer may be formed on the substrate layer by any conventional method, such as vapor deposition, sputtering, and the like.

The addition of at least one metal selected from the group consisting of manganese, copper and magnesium to the aluminum contributes to an improvement of the printing quality. The addition of such a metal to aluminum does not change its bulk resistance, but a surface resistivity of the thin metal layer is slightly changed, namely increased. For example, an aluminum film having a thickness of about 500 Å has a surface resistivity of 1 Ω/□, while a metal film having the same thickness of aluminum containing the above additional metals has a surface resistivity of about 1 to 5 Ω/□. Then, a high electric field can be applied between the discharging electrode and the metal layer, and the aluminum is made molten and splashed with a high energy to give a clear and sharp image.

Another cause of corrosion of the metal layer is an electrochemical reaction between the metal layer and adjacent layers. To prevent the corrosion caused by the electrochemical reaction, the present invention provides an additional layer made of a base metal which has a lower standard electrode potential than the metal of the thin layer of the aluminum alloy.

In the electrochemical reaction of the thin metal layer, an example of a counter electrode is a colored layer. The colored layer contains carbon black or magnetic powder as a coloring pigment and such a pigment forms a counter electrode to the thin metal layer in an aqueous solution. The printed images disappear when the thin metal layer acts as a positive electrode and the metal is dissolved. If the thin metal layer is changed to a negative electrode, the corrosion is prevented. To this end, the layer made of the base metal having a lower standard electrode potential than the aluminum alloy is provided.

In the above explanation, the positive electrode intends to mean an electrode which emits electrons, and the negative electrode intends to mean an electrode that receives the electrons. For example, when the thin metal layer comprises aluminum alloy, magnesium is an example of a base metal which has a lower standard electrode potential than aluminum and a layer comprising magnesium makes the aluminum layer negative.

The layer of the base metal which has a lower standard electrode potential than the aluminum alloy may be formed in a thin layer by vapor deposition or sputtering, or such metal is dispersed in a resin binder and coated to form a thin film.

When the discharge recording medium is dipped in a liquid which acts as an electrolyte solution, such as an aqueous solution of a salt (e.g. sodium chloride), the base metal, which has a lower standard electrode potential than the aluminum alloy, is eluted but such elution does not lead to erasing of the printed images.

When structural factors including position of the layer of the base metal, which has a lower standard electrode potential than the aluminum alloy, are suitably selected, the appearance of the discharge recording medium of the present invention is not materially affected.

In addition, in a case of the discharge recording medium having a substrate layer which is made of a transparent resin and formed on a the colored layer and the thin metal layer is formed on the transparent substrate layer, the electrochemical reaction between the thin metal layer and the colored layer can be suppressed by a barrier layer which is made of a highly insulating resin and has a relatively large thickness. This utilizes a phenomenon that, when a distance between the electrodes is longer and/or the resistance between them is higher, the electrochemical reaction, namely migration of ions between the electrodes is more difficult, and therefore the electrochemical reaction proceeds more slowly.

The increase of the thickness of the substrate layer makes the distance between the electrodes large. But, since the substrate layer should have good adhesion with the metal layer, a highly insulating resin is not necessarily used to form the substrate layer. Then, it is preferable to form a barrier layer from the resin which is different one from that forming the substrate layer.

The larger thickness of the barrier layer provides better corrosion resistance. When the barrier layer has a thickness of at least 1 μm, the corrosion is effectively prevented. The upper limit of the barrier layer thickness is not limited. Practically, it is necessary for the colored layer to be visible clearly, and there is some limitation on the upper limit of the barrier layer thickness. In general, the barrier layer has a thickness of not larger than 5 μm.

When the barrier layer has a resistivity of at least $10^9$ Ω.cm, the effect of the barrier is clear. In addition, to increase the evironmental resistance of the discharge recording medium, the barrier layer is preferably made of a material having good resistance to heat and moisture.

When the colored layer contains the magnetic layer and the discharge recording medium also acts as a magnetic recording medium, too thick of a barrier layer decreases output of the magnetism. The thickness of the barrier layer is preferably not larger than 5 μm.

Examples of the resin which forms the barrier layer are synthetic resins such as polyurethane resin, acrylic resin, polyimide resin, vinyl chloride-vinyl acetate copolymer, silicone resin, acryl-silicone resin, polyester resin, epoxy resin, phenoxy resin and mixtures thereof. The resin may be cross-linked with, for example, an isocyanate compound.

Also, the corrosion of the thin metal layer can be prevented by a protective layer made of a resin having a functional group which chemically bonds with the metal.

By the chemical bond of the resin of the protective layer with the metal, the metal-resin adhesion is strengthened so that penetration of moisture is significantly decreased and the corrosion resistance is improved. In particular, when the discharge recording medium is used in the form of a card or a sheet, the corrosion caused by the moisture penetration into the metal/resin interface from its edges is effectively prevented.

Preferred examples of the resin having the functional group which reacts with the metal are silicone polymers such as an acryl-silicone polymer, though other polymers may be used.

The printing characteristics of the discharge recording medium can be improved by roughening the surface of the discharge recording medium to 250 seconds or less in terms of the Beck smoothness. This has been found by the following study.

The printed part of the discharge recording medium was observed by a microscope to analyze the mechanism of electric current passage from the electrode to the thin metal layer which passage is a basic mechanism of the printing, and it was found that, in a micro scale, there is an electric field-concentrated part which is a starting point of the electric current passage in each dot, and the discharge breakdown proceeds selectively at this point.

Based on the above finding, it has been concluded that, when the surface roughness of the discharge recording medium is increased intentionally to form minute protrusion, the discharge is easily induced so that the printing is performed stably and smoothly even if the protective layer has an uneven thickness more or less.

Then, a relationship between the surface roughness of the discharge recording medium and the printing characteristics was studied and it was found that when the surface is roughened to at most 250 seconds of the Beck smoothness, the discharge is easily induced and the high printing density is stably achieved.

Strictly speaking, a factor which influences the printing quality is surface roughness of the metal thin layer. But, it is possible to evaluate the surface roughness of the metal thin layer by the measurement of the surface roughness of the discharge recording medium, because a total thickness of the thin metal layer and the protective layer is usually about 1 μm and the roughness of the substrate layer is faithfully traced by the surface of the discharge recording medium.

To roughen the surface of the medium, any method may be used. For example, fine-grain particles having a suitable particle size are added to the substrate layer or the colored layer. The surface roughness can be adjusted by the selection of the particle size.

The addition of the particles to the colored layer achieves both coloring with the color pigment for a contrast of printing and the surface roughening at the same time.

Since carbon black which is used as a color pigment easily forms an electrode in the aqueous solution, its addition to the colored layer facilitates the electrochemical reaction between the thin metal layer and the colored layer. Therefore, carbon black is not preferred practically.

The present invention provides two measures for roughening the surface without decreasing the corrosion resistance.

One of them is the use of fine-grain particles of an electrochemically inactive organic polymer. Different from the inorganic pigment such as carbon black, the organic polymer particles are highly insulating and do not form an electrode in the aqueous solution and cause an electrochemical reaction with the metal thin layer.

Examples of the organic polymer are acrylic resin, melamine resin, polyvinyl chloride resin, polyurethane resin, polyester resin, polyethylene, polypropylene, epoxy resin, polyvinylidene chloride, polyamide, and mixtures thereof.

The fine-grain particles of the organic polymer are preferably added to the barrier layer which is formed on the colored layer, or the substrate layer.

Another measure is chemical or mechanical roughening of the surface of the substrate layer or the barrier layer.

As a typical example of the chemical treatment, the surface of the substrate layer or the barrier layer is dipped in a dissolving chemical such as an organic solvent for a short time to dissolve or swell parts of the surface. Surface roughness can be controlled by selecting a kind of the chemical and/or adjusting the dipping time.

Examples of the mechanical treatment are sand blasting and calendering.

In the mechanical treatment, the surface roughness is controlled by selecting a kind of sand used in the sand blasting and corresponding conditions, or a kind of a roll used in calendering.

The surface roughening by such treatment does not corrode the metal thin layer through the electrochemical reaction. The surface roughening of the discharge recording medium increases the printing density and suppresses dispersion of the density.

When the corrosion resistance of the discharge recording medium is improved by the technique other than the use of the alloy of aluminum and manganese, copper or magnesium, aluminum alone, silver or tin may be used as the thin metal layer.

Further, a material of the substrate layer was studied to improve the printing characteristics and it was found that the use of a resin having a low glass transition temperature and a small modulus of elasticity at a high temperature as the substrate layer material improves the printing density. This is because when the thin metal layer is molten by the Joule heat and splashed, a small adhesive strength of the metal to the substrate is advantageous for the splashing of the molten metal and the adhesive strength is decreased by softening of the substrate material at the high temperature.

When the glass temperature is 100° C. or lower, preferably, 80° C. or lower, the above effect is apparent. If the glass transition is lower than 30° C., preservation of the printed images is unpreferably deteriorated.

Examples of the resin having the relatively low glass transition temperature are acrylic resin, polyvinyl butyral, vinyl chloride-vinyl acetate copolymer, polyacetal, polyimide, acryl-silicone resin and mixtures thereof.

The thickness of the substrate layer varies with a kind of material and method for forming the layer. Usually, it is 5 $\mu$m or less, preferably 3 $\mu$m or less, more preferably 1 $\mu$m or less. If the thickness is smaller than 0.2 $\mu$m, the layer does not function as a substrate layer.

As a base material, a film of a plastic such as polyamide (Nylon), cellulose diacetate, cellulose triacetate, polystyrene, polyethylene, polypropylene, polyester, polyimide, polycarbonate, polyethylene terephthalate, polyethylene naphthalate and the like may be used.

As the protective layer, a silicone polymer such as an acryl-silicone resin is preferred as described above. Over such protective layer, a further layer such as a layer of a UV light curable acryl-modified resin may be provided to form a multilayer protective layer.

In any case, a thickness of the protective layer does not exceed 1 $\mu$m. Otherwise, the electric current does not reach the thin metal layer. Usually, the thickness is about 0.5 $\mu$m. When the thickness is smaller than 0.1 $\mu$m, the layer may not function as the protective layer.

Examples of the binder resin in the colored layer are vinyl chloride-vinyl acetate copolymer, cellulose resin, polyvinyl chloride resin, polyvinyl butyral resin, polyurethane resin, polyester resin, acrylic resin, phenol resin, isocyanate compounds and the like. Among them, the polyurethane resin, the vinyl chloride-vinyl acetate copolymer and the polyvinyl chloride resin having acrylic hydroxyl group are preferred.

The coloring pigment to be contained in the colored layer should have a color which is visible in contrast to the thin metal layer. In view of the contrast, black is preferred. When the pigment functions as the colorant and the magnetic recording material, a magnetic powder is used. By the use of the magnetic powder, the surface is also roughened. Another example of the coloring pigment is carbon black. Other inorganic and organic pigments having various colors may be used.

To the surface of the discharge recording medium, a grounding electrode and printing electrodes are contacted and the electric current is applied therebetween to melt and splash a part of the metal thin layer to perforate the metal thin layer, whereby an image is printed on the medium. A printing speed of the discharge recording medium is vary fast and at least three times faster than the thermal printing method.

PREFERRED EMBODIMENTS OF THE INVENTION

The present invention will be explained further in detail by following Examples, in which "parts" are by weight.

EXAMPLE 1

Several discharge recording media were produced and their properties were evaluated.

I. Production of Discharge Recording Media

In this Example 1, each discharge recording medium had a structure a cross section of which is shown in FIG. 1. This medium comprises a base film 1, a colored layer 2, a substrate layer 3, a thin metal layer 4 and a protective layer 5.

The layers 2 to 5 were formed by the following steps A to D.

A. Formation of the Colored Layer 2

In a ball mill, barium ferrite magnetic power having an average particle size of 0.8 $\mu$m (80 parts), a vinyl chloride-vinyl acetate-vinyl alcohol copolymer having acrylic hydroxyl groups (VAGF (trade name) manufactured by U.C.C.) (10 parts), polyurethane resin (Pandex T 5201 (trade name) manufactured by Dainippon Ink Chemical Industries, Ltd.) (7 parts), a trifunctional isocyanate compound (Colonate L (trade name) manufactured by Nippon Polyurethane Industries, Ltd.) (1 part), carbon black (4 parts), toluene (260 parts) and cyclohexanone (260 parts) were mixed to prepare a magnetic paint.

The magnetic paint was gravure coated on the base film 1 made of a polyethylene terephthalate film having a thickness of 188 $\mu$m to form the black colored layer 2 having a thickness of 15 $\mu$m.

B. Formation of the Substrate Layer 3

On the colored layer 2, an acryl-silicone resin prepared by copolymerizing a silane compound with an acrylic resin (Silacoat SCT 6101 (trade name) manufactured by Tisso) was gravure coated to a thickness of 2.5 $\mu$m to form the substrate layer 3.

C. Formation of the Metal Thin Layer 4

Using one of the following six aluminum alloys 1) and aluminum 7), the thin metal layer 4 having a thickness of 500 Å was formed by vacuum deposition with a resistance heating vapor deposition apparatus (EBX-6 manufactured by ULBAC) under pressure of $1 \times 10^{-5}$ Torr. at a deposition rate of 50 Å without heating the substrate layer 3.

Metal Alloys (% by weight)
1) Al/1% Mn
2) Al/0.1% Cu/1% Mn
3) Al/2.5% Cu
4) Al/0.3% Cu/1% Mg
5) Al/5% Mg
6) Al/10% Mg
7) Al

D. Formation of the Protective Layer 5

On each of the above seven metal thin layers, one of the following two resins was coated to form the protective layer 5 having a thickness of 0.4 $\mu$m.
 a) An acryl-silicone resin prepared by copolymerizing a silane compound on an acrylic resin (Silacoat SCT 6101 (trade name) manufactured by Tisso). This resin a) adheres to the metal strongly through siloxane bondings.
 b) An acrylic resin.

Following 14 combinations were used to produce the discharge recording media:

1)-a), 1)-b), 2)-a), 2)-b), 3)-a), 3)-b) 4)-a), 4)-b), 5)-a), 5)-b), 6)-a), 6)-b) 7)-a) and 7)-b).

II. Evaluation of the Discharge Recording Media

The printing characteristics and the environmental resistance of the produced discharge recording media were tested and evaluated by the following methods E to G:

E. Printing Test

On each of the 14 discharge recording media, dots were printed using a discharge printing head having a dot density of 8 lines/mm and a dot size of 120 μm × 120 μm at a printing speed of 150 mm/sec.

F. Evaluation of Printing Density

The printing density was evaluated by measuring a so-called reflection density using a densitometer (RD 915 manufactured by Macbeth) in a 5 mm square area. The density was an averaged value including unmolten parts between the dots. Shapes of the character style were observed using an optical microscope (100 times magnification).

G. Environmental Resistance

Each of the 14 discharge recording media was kept standing at 60° C. in an atmosphere of a relative humidity of for 10 days and its appearance change and fading of the printed parts were observed. In addition, each medium was dipped in a 5% aqueous solution of sodium chloride for 24 hours and its appearance change was observed.

For comparison, a thermal printing medium using tin was tested (Sample No. 8).

The results are shown in Table 1.

The criteria in Table 1 are as follows:

Environmental Resistance

A: No appearance change.
B: Slight appearance change but no influence on the printed image.
C: Corroded but the images were readable.
D: Heavily corroded and the images were unreadable.

Printing Density

A: Reflection density > 1.
B: 1 > Reflection density > 0.7.
C: 0.7 > Reflection density.

Sharpness of the Image

A: Quite sharp with no sagging.
B: Slightly sagged.
C: Sagged.

TABLE 1

| Sample | Environmental resistance After kept standing at 60° C., 90% RH | Environmental resistance After dipped in 5% NaCl | Printing density | Sharpness of images |
| --- | --- | --- | --- | --- |
| 1)-a) | A | B | B | A |
| 1)-b) | B | C | B | A |
| 2)-a) | A | A | A | A |
| 2)-b) | B | B | A | A |
| 3)-a) | A | B | A | B |
| 3)-b) | B | C | A | B |
| 4)-a) | A | A | A | A |
| 4)-b) | A | B | A | A |
| 5)-a) | A | B | A | B |
| 5)-b) | B | C | A | B |
| 6)-a) | A | A | B | A |
| 6)-b) | A | B | B | A |
| 7)-a) | C | C | B | B |
| 7)-b) | D | D | B | B |
| 8 | B | A | B | C |

The sample Nos. 1) to 6) using the aluminum alloy containing Cu, Mn or Mg had better corrosion resistance, a higher printing density and better image sharpness than the sample No. 7) using aluminum alone. In comparison, the sample Nos. 1) to 7) with a) should be compared and those with b) should be compared.

In particular, the sample No. 2)-a) and 4)-a) in which three metals were used and the acryl-silicone resin was used as the protective layer 5 and the sample No. 6)-a) in which the content of Mg was high and the acryl-silicone resin was used as the protective layer 5 were not corroded in the high temperature and humidity atmosphere and in the aqueous solution of sodium chloride.

Comparing the two protective layers a) and b), the acryl-silicone resin which can be chemically bonded to the metal imparted better environmental resistance to the media. From this, the effect of the increase of adhesion of the protective layer to the thin metal layer was confirmed.

EXAMPLE 2

This Example confirms the improvement of environmental resistance of the discharge recording media by the formation of a layer of a base metal having a lower standard electrode potential than the aluminum alloy.

i) A discharge recording medium (i) was produced in the same manner as in Example 1 except that, on a first substrate layer having a thickness of 2 μm, a thin layer of magnesium was formed; on the Mg layer, a second substrate layer having a thickness of 0.5 μm was formed; on the second substrate layer, aluminum was vapor deposited as the thin metal layer 4; and on the metal layer 4, the same acryl-silicone resin as the resin a) used in Example 1 was coated to form the protective layer 5.

The above Mg layer was formed by vacuum deposition with a resistance heating vapor deposition apparatus to a thickness of 500 Å. A material of the first and second substrate layers was the acryl-silicone resin.

Figure 2:
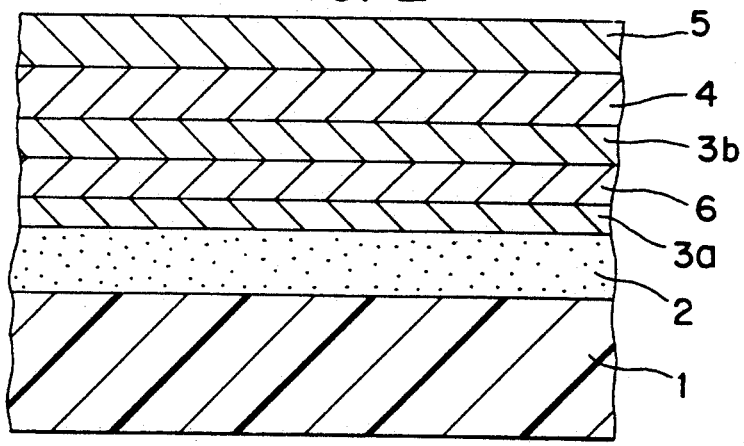

The produced medium had a cross section shown in FIG. 2. That is, the medium comprises the base film 1, the colored layer 2, the first substrate layer 3a, the layer 6 of a base metal having a lower standard electrode potential than the metal of the thin metal layer 4, the second substrate layer 3b, the thin metal layer 4 and the protective layer 5.

ii) A discharge recording medium (ii) was produced in the same manner as in Example 1 except that, an aluminum thin layer was formed as the metal thin layer 4; and on the metal thin layer 4, the protective layer 5 was formed from the same acryl-silicone resin as the resin a) of Example 1 which contained 30% by weight of magnesium powder having an average particle size of 0.5 μm.

This medium had substantially the same cross section as FIG. 1, but the protective layer 5 also functioned as the layer 6 of the base metal of FIG. 2.

For comparison, a discharge recording medium (iii) was produced in the same manner as in the production of the medium (ii) except that aluminum was used in place of magnesium in the formation of the layer 6.

These two media (i), (ii) and (iii) were subjected to the environmental resistance test in the same manners as in Example 1.

The results are shown in Table 2.

TABLE 2

| Medium No. | Environmental resistance | |
|---|---|---|
| | After kept standing at 60° C., 90% RH | After dipped in 5% NaCl |
| (i) | A | A |
| (ii) | A | B |
| (iii) | D | D |

As understood from the results of Table 2, the medium (i) having the base metal layer 6 and the medium (ii) containing the base metal in the protective layer 5 had better environmental resistance than the medium (iii), and the printed images were not damaged by the corrosion after being kept in the high temperature and humidity atmosphere or the aqueous solution of sodium chloride.

The media (i), (ii) and (iii) had substantially the same printing characteristics according to the same test as in Example 1.

EXAMPLE 3

A discharge recording medium (iv), (v), (vi) or (vii) was produced in the same manner as in Example 1 except that, between the colored layer 2 and the substrate layer 3, a barrier layer having a thickness of 2 μm was formed from one of the following four resins a'), b'), c') and d'); on the colored layer, an aluminum layer was formed as the thin metal layer 4; and on the thin metal layer 4, the protective layer 5 was formed from the same acryl-silicone resin as the resin a) of Example 1:

a') Polyimide resin having a resistivity of $10^{15}$ Ω.cm.
b') Polyurethane resin having a resistivity of $10^{11}$ Ω.cm.
c') Acrylic resin having a resistivity of $10^9$ Ω.cm.
d') Polybutyral resin having a resistivity of $10^3$ Ω.cm.

Figure 3:
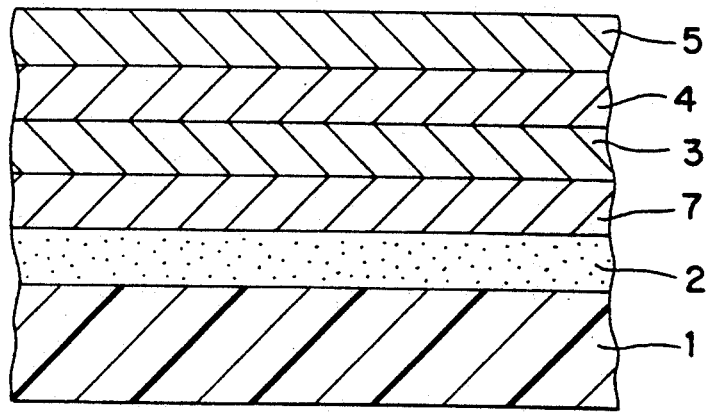

Each medium produced in this Example had the cross section of FIG. 3. That is, the medium comprises the base film 1, the colored layer 2, the barrier layer 7, the substrate layer 3, the thin metal layer 4 and the protective layer 5.

These four media were subjected to the environmental resistance test in the same manners as in Example 1.

The results are shown in Table 3.

TABLE 3

| Medium No. | Environmental resistance | |
|---|---|---|
| | After kept standing at 60° C., 90% RH | After dipped in 5% NaCl |
| iv | A | B |
| v | B | C |
| vi | C | C |
| vii | D | D |

As understood from the results of Table 3, the barrier layer having the high resistivity between the colored layer 2 and the substrate 3 improved the environmental resistance.

The media (iv), (v), (vi) and (vii) had substantially the same printing characteristics according to the same test as in Example 1.

EXAMPLE 4

Production of Discharge Recording Media (1) to (4)

A. Formation of the Colored Layer 2

The colored layer 2 was formed in the same manner as in Example 1 except changing an average particle size as follows:

(1) 0.7 μm
(2) 1 μm
(3) 1.5 μm
(4) 4 μm

B. Formation of the Substrate Layer 3

On each of the four colored layers 2, the acryl-silicone resin (Silacoat SCT 6101 (trade name) manufactured by Tisso) was gravure coated to a thickness of 2.5 μm to form the substrate layer 3.

Except that the colored layer 2 and the substrate layer 3 were formed as above, a discharge recording medium (1), (2), (3) or (4) was produced in the same manner as in Example 1.

The protective layer 5 was formed from the acryl-silicone resin (Silacoat SCT 6101).

The Beck smoothness of the surface of each of the above four media (1) to (4) was measured. The medium (1) to (4) had the Beck smoothness of 280 seconds, 250 seconds, 150 seconds and 80 seconds, respectively.

Production of Discharge Recording Media (5) to (8)

A. Formation of the Colored Layer 2

The colored layer 2 was formed in the same manner as in Example 1 except that the barium ferrite powder had the average particle size of 0.7 μm.

B. Formation of the Substrate Layer 3 Medium (5)

A paint was prepared by adding 30% by weight of melamine resin powder having an average particle size of 1 μm to the acryl-silicone resin (Silacoat SCT 6101) and gravure coated on the colored layer 2 to a thickness of 2.5 μm to form the substrate layer 3.

Media (6), (7) and (8)

The same acryl-silicone resin as used in the formation of the substrate layer of the medium (5) was gravure coated to a thickness of 2.5 μm to form the substrate layer 3.

A surface of each of the media (6), (7) and (8) was roughened by one of the following methods (a"), (b") and (c").

(a"). The substrate layer surface was roughened with a calender roll having a center line average height of 1.0 μm.

(b") The substrate layer surface was gravure coated with methyl ethyl ketone which has a fast drying speed.

(c") The substrate layer surface was sand blasted.

On the substrate layer 3 of the medium (5) formed rate layer 3 of each of the media (6), (7) and (8), aluminum was vapor deposited to form the metal thin layer 4, and, on the thin metal layer 4, the acryl-silicone resin protective layer 5 was formed in the same manner as in Example 1 to produce four discharge recording media (5) to (8).

The Beck smoothness of the surface of each of the above four media (5) to (8) was measured. The medium (5) to (8) had the Beck smoothness of 60 seconds, 90 seconds, 55 seconds and 70 seconds, respectively.

C. Evaluation of the Printing Density

The printing density was evaluated by measuring the reflection density using the densitometer (RD 915 manufactured by Macbeth) in a 5 mm square area. The density was an averaged value including unmolten parts between the dots. To examine the dispersion of the printing density, the printing density was measured at 10 points in an area of 100 mm$^2$ and the different between the maximum value and the minimum value was defined as a dispersion width of the printing density.

The criteria of the dispersion width of the printing density are as follows:
A: 0.2 or less.
B: Larger than 0.2 and not larger than 0.6.
C: Larger than 0.6.

The results are shown in Table 4.

TABLE 4

| Medium No. | Printing density | Dispersion width of printing density | Beck smoothness |
| --- | --- | --- | --- |
| (1) | C | C | 280 |
| (2) | B | B | 250 |
| (3) | B | B | 150 |
| (4) | A | A | 80 |
| (5) | A | A | 60 |
| (6) | A | B | 90 |
| (7) | A | A | 55 |
| (8) | A | B | 70 |

As seen from the results of Table 4, the medium (1) having the Beck smoothness of 280 seconds had the small printing density and the large dispersion width of the printing density, while the media (2) to (8) having the Beck smoothness of less than 250 seconds had the large printing density and the small dispersion width of the printing density.

In particular, when the Beck smoothness was 100 seconds or less as in the media (4) to (8), the printing density was large. In addition, when the Beck smoothness was 80 seconds or less as in the media (4) (5), (7) and (8), the dispersion width of the printing density was also large.

D. Evaluation of Environmental Resistance

With the media (4) to (8) having good printing characteristics, the environmental resistance was evaluated in the same manner as in Example 1. The results are shown in Table 5.

TABLE 5

| | Environmental resistance | |
| --- | --- | --- |
| Medium No. | After kept standing at 60° C., 90% RH | After dipped in 5% NaCl |
| (4) | D | D |
| (5) | A | B |
| (6) | A | A |
| (7) | A | B |
| (8) | A | A |

As understood from the results of Table 5, the images on the medium (4) was unreadable due to severe corrosion since the surface of the medium (4) was roughened by using the barium ferrite magnetic powder having the larger particle size. That is, the medium (4) had poor environmental resistance.

On the contrary, the medium (5) the surface of which was roughened by the use of the organic polymer particles, and the media (6), (7) and (8) the surfaces of which were roughened by the chemical or mechanical treatment were less corroded, namely, in the media (6), (7) and (8), the printing characteristics was improved without deteriorating the environmental resistance.

EXAMPLE 5

This Example examined the influence of a kind of the substrate layer 3 on the printing characteristics.

A. Formation of the Substrate Layer 3

A discharge recording medium (aa), (bb), (cc) or (dd) was produced in the same manner as in Example 3 except that each of the following four resins was gravure coated to a thickness of 2.5 μm to form the substrate layer 3:
 (aa): Polyvinyl butyral resin having a glass transition temperature of 50° C.
 (bb): Polymethyl methacrylate having a glass transition temperature of 110° C.
 (cc): Thermosetting polyurethane resin having a glass transition temperature of 70° C.
 (dd): Acrylic resin having a glass transition temperature of 90° C.

On each of the four discharge recording median, dots were printed using a discharge printing head having a dot density of 8 lines/mm and a dot size of 120 μm × 120 μm at a voltage of 50 V and a printing speed of 150 mm/sec.

The results of the printing density evaluation are shown in Table 6.

TABLE 6

| Medium No. | Printing density | Glass transition temperature (°C.) |
| --- | --- | --- |
| (aa) | A | 50 |
| (bb) | D | 110 |
| (cc) | B | 70 |
| (dd) | C | 90 |

As is clear from the results of Table 6, when the resin of the substrate layer 3 had the glass transition temperature of 110° C. as in the medium (bb), the printing density was low. As the transition temperature of the substrate layer resin decreased, the printing density increased. In particular, with the medium (aa) using the resin having the glass transition temperature of 50° C., the printing density was large and the printed images were clear.

After keeping standing the four media (aa) to (dd) in an atmosphere of 90% relative humidity at 60° C. for 10 days, the change of appearance and fading of the printed part were observed. Though the appearance was slightly colored, the printed images were readable in all of the four media.

From the above results, the resin having the glass transition temperature of 80° C. or lower will impart good printing characteristics to the discharge recording medium.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A discharge recording medium comprising a substrate having a thickness greater than 0.2 μm and a metal layer formed on a first surface of said substrate, said metal layer comprising aluminum containing at least one metal selected from the group consisting of manganese, copper and magnesium in an amount of from 0.05 to 20% by weight.

2. The discharge recording medium according to claim 1, further including a base metal layer comprising a base metal having a lower standard electrode potential than said metal of said metal layer, said base metal layer being formed on a second surface of said substrate opposite said first surface.

3. The discharge recording medium according to claim 2, wherein said base metal layer comprises a resin containing said base metal.

4. The discharge recording medium according to claim 1, wherein said substrate contains a coloring pigment.

5. The discharge recording medium according to claim 4, wherein said coloring pigment is a magnetic powder.

6. The discharge recording medium according to claim 1, further including a colored layer containing a coloring pigment and wherein said substrate is a transparent layer formed on said colored layer.

7. The discharge recording medium according to claim 6, wherein said coloring pigment is a magnetic powder.

8. The discharge recording medium according to claim 6, which further comprises a barrier layer having thickness of from 1 to about 5 μm and a resistivity of at least $10^9$ Ω.cm between said substrate and said colored layer.

9. The discharge recording medium according to claim 1, further including a protective layer having a thickness up to about 1 μm on said metal layer.

10. The discharge recording medium according to claim 9, wherein said protective layer comprises a resin having a functional group capable of reacting with said metal of said metal layer.

11. A discharge recording medium which comprises a substrate having a thickness greater than 0.2 μm and a metal layer on a surface of said substrate, a surface of said recording medium having a surface smoothness of 250 seconds or less in terms of a Beck smoothness.

12. The discharge recording medium according to claim 11, wherein said substrate contains fine-grain particles of an organic polymer to roughen said surface of said recording medium.

13. The discharge recording medium according to claim 11, wherein said substrate is chemically or mechanically treated to roughen said surface of said recording medium.

14. The discharge recording medium according to claim 11, which further includes a barrier layer having a thickness of from 1 to about 5 μm on said metal layer, said barrier layer containing fine-grain particles of an organic polymer to roughen said surface of said recording medium.

15. The discharge recording medium according to claim 11, which further includes a barrier layer having a thickness of from 1 to about 5 μm on said metal layer, said barrier layer being chemically or mechanically treated to roughen said surface of said recording medium.

16. A discharge recording medium comprising a substrate having a thickness greater than 0.2 μm which comprises a resin having a glass transition temperatures of from 30° C. to 100° C. and a metal layer comprising aluminum containing at least one metal selected from the group consisting of manganese, copper, and magnesium in an amount of from 0.05 to 20% by weight.

* * * * *